United States Patent Office 3,148,977
Patented Sept. 15, 1964

3,148,977
METHOD OF PURIFYING URANIUM METAL
Robert J. Teitel, Northridge, Calif., and Gilbert S. Layne, Midland, Mich., assignors to The Dow Chemical Company, Midland, Mich., a corporation of Delaware
No Drawing. Filed Dec. 11, 1961, Ser. No. 158,603
9 Claims. (Cl. 75—84.1)

This invention relates to an improved method for purifying impure uranium, or an alloy of uranium, and is particularly concerned with a pyrometallurgical process for reducing the level of impurities in impure uranium, such as fission products, in neutron-irradiated uranium or uranium alloys, and recovering the uranium as the metal or as an alloy, rather than as a chemical compound.

For the purposes of the specification and claims, the impure uranium or uranium alloy to be subjected to the process of the invention is referred to as uranium metal.

Heretofore, spent nuclear reactor fuel elements and neutron-irradiated metallic blanket material have been processed by chemical rather than metallurgical processing methods. Chemical methods are subject to certain serious disadvantages such as the use of large quantities of corrosive acid solutions, the handling of large volumes of solutions, the numerous processing steps, the difficulties in handling highly radioactive materials during lengthy processing, the necessity to reduce purified uranium compounds to the metallic state in the process of obtaining refined metal, and the problem of concentrating radioactive waste solutions for disposal and storage. These problems are overcome by the use of the pyrometallurgical method hereinafter disclosed and claimed.

It is an object of the present invention to provide a method widely adaptable to purifying uranium metal without taking up the uranium into the purifying agent or medium.

It is another object of the invention to provide a method for processing uranium metal in which the purifying agent or medium is not miscible with the uranium metal.

It is another object of the invention to provide a method by which it is inherently possible to refine uranium metal substantially without loss of uranium.

Another object of the invention is to provide a method for processing uranium metal in which the uranium remains as a metal or as an alloy throughout the process.

Another object of the invention is to provide a method for processing uranium metal and recovering the uranium as metallic uranium or as a uranium alloy.

Still another object of the invention is to provide a method for separating uranium from thorium, as in the processing of neutron-irradiated thorium, in order to recover the isotope uranium-233.

It is a further object of the invention to provide a method for purifying uranium metal which is readily carried out by remote control.

It is a still further object of the invention to provide a method for purifying uranium metal by which radioactive contaminants removed from the treated uranium metal are recovered in a concentrated, readily disposable form.

Other objects and advantages of the invention will become apparent to those skilled in the art upon becoming familiar with the following description and claims.

The invention is based on the discovery that upon intimately contacting an impure uranium metal at an elevated temperature and under an inert atmosphere with a molten magnesium-copper alloy, the nature of which is hereinafter more fully defined, with which the uranium metal is substantially immiscible at said elevated temperature, impurities which are miscible in the magnesium-copper alloy are extracted from the uranium metal without the necessity of taking up, i.e., alloying, and precipitating the uranium metal.

The uranium metal, which may be processed according to the invention, includes uranium and alloys of uranium containing as little as 5 percent by weight of uranium. Alloys containing from 5 to 1 percent or less of uranium may also be processed by the present method, if desired, if relative percentage losses of uranium greater than 0.2 percent may be tolerated.

The term immiscible uranium metal is meant to include uranium and uranium alloys which are immiscible, while in solid form, with magnesium-copper alloy, as well as uranium alloys which are, while in molten form, immiscible with magnesium-copper alloy.

The magnesium-copper alloy used as the purifying agent or medium contains at least 30 percent by weight of magnesium and at least 20 percent by weight of copper, and not more than 10 percent by weight of other metals. Desirably, the alloy contains at least 50 percent by weight of magnesium and most preferably, the alloy contains from 1.5 to 4 parts by weight of magnesium per part of copper, and not more than 10 percent by weight of other metals.

In carrying out the process of the invention wherein the uranium metal is in, and remains in, immiscible solid form, the uranium metal is mechanically reduced and dried, and degreased, if indicated. The prepared uranium metal and at least 4 parts by weight of the magnesium-copper alloy per part of miscible impurity in the uranium metal, but the weight of magnesium-copper alloy being at least equal to the weight of uranium, are placed in a suitable apparatus and heated under an inert atmosphere to a temperature in the range of 550°–900° C. Preferably, at least 6 parts by weight of magnesium-copper alloy per part of miscible impurity in the uranium metal is employed. Maximum amounts of magnesium-copper alloy that can be used are governed by the uranium loss which can be tolerated. The use of more than about 60 to 100 parts of magnesium-copper alloy per part by weight of uranium will generally result in a substantial percentage loss of uranium (greater than about 0.4–0.5%, based on the total amount of uranium). Heating is usually continued for a period of from 2–10 hours, during which time the magnesium-copper alloy in molten form leaches out soluble or miscible impurities without taking up the uranium itself. Heating times vary with the particle size of the uranium metal. The particles, or pieces, are preferably not more than 2–4 millimeters thick in the shortest dimension, more preferably, less than 2 millimeters thick.

The process may be carried out in any suitable apparatus formed of molten metal-resistant container material, for example, a graphite crucible which may be placed in a muffle furnace in which an inert atmosphere may be maintained. In this apparatus, the uranium product is separated from the magnesium-copper alloy by allowing the uranium metal to settle, then allowing the charge to cool and solidify, and afterwards sawing off, or otherwise cutting off, the settled portion containing the uranium.

It is generally more convenient or desirable, however, to use an apparatus adapted for filtration of molten metals, e.g., the apparatus described in a copending application, Serial No. 825,389, filed July 2, 1959, now U.S. Patent 3,053,650. The filtration apparatus is similarly constructed of graphite in all parts contacting the molten metals, is provided with means for maintaining an inert atmosphere, and with means for filtering liquid metal through a graphite frit filter disposed in a filter sleeve. Using such an apparatus, the supernatant melt is more completely separated from the settled solids during the filtration or separating step, and furthermore, the solids on the filter may be readily washed with molten magnesium, if desired, to free the solids of residual melt containing copper.

In using the said filtration apparatus, the uranium metal and the magnesium-copper alloy are placed above the graphite frit filter and heating is carried out with a zero pressure differential across the filter. At the end of the heating period, the magnesium-copper alloy is readily separated by increasing the gas pressure above the filter, forcing the liquid melt through the filter into a collector, such as a crucible, disposed below the filter. Washing is carried out by placing magnesium above the filter, melting the magnesium and maintaining it in contact with the uranium solids for about 15 minutes to an hour, while maintaining zero pressure differential across the filter, and thereafter increasing the gas pressure above the filter to force out the magnesium wash. Thereafter, the processed uranium may be freed of magnesium, if desired, by heating the uranium to distill the magnesium therefrom, as well understood in the metallurgical art.

In carrying out the process of the invention on uranium metal in molten immiscible form, a uranium metal, such as, a uranium-chromium alloy consisting of about 3 to 10 percent by weight of chromium and the balance substantially uranium, having a melting point in the temperature range in which it may be contained in suitable container material, is heated in contact with a magnesium-copper alloy under an inert atmosphere for a period of from 1-5 hours or more. The relative amounts of uranium metal, magnesium-copper alloy and uranium used in this embodiment are the same as those indicated hereinabove for use in the treatment of solid immiscible uranium metal. During the heating period, the immiscible molten metals may be agitated mechanically or by gas sparging, if desired, to increase the rate of extracting impurities from the uranium metal. The temperatures during the heating period are maintained at least as high as the melting temperature of the uranium alloy, generally in the range of 750°–950° C.

The embodiment of the process in which both phases are liquid may be carried out in a simple crucible. At the end of the heating period, the phases are allowed to settle without being disturbed during at least 30 minutes to an hour, and the metals are then allowed to cool, preferably rapidly, and solidify. The uranium is recovered by separating the magnesium-copper alloy from the uranium metal at the solidified interface. Or if desired, the magnesium-copper alloy may be decanted, control being accomplished by the use of a radiation detector for detecting the uranium layer. Or, the magnesium-copper alloy and the uranium metal, if in molten form, may be contacted in a countercurrent apparatus formed of suitable container material, much in the manner of the organic solvent-type liquid-liquid extraction method.

While the following examples serve to illustrate the process of the invention, the process is not to be construed as limited thereto.

*Example 1*

An arc-melted button consisting of 10 weight percent uranium and the balance thorium, weighting 42 grams, was placed in a graphite crucible in a muffle furnace along with 214 grams of a magnesium-copper alloy consisting of 30 weight percent of copper and the balance magnesium. The furnace charge was heated to 800° C. and maintained at that temperature for five hours, under an inert atmosphere. A solids-free sample of the melt was then taken while the melt was still at 800° C. Chemical analysis of the sample showed that it contained by weight 26.5 percent of copper, 61.7 percent of magnesium, 9.9 percent of thorium and 0.0055 percent of uranium. This analysis indicates that about two-thirds of the thorium was taken up by the magnesium-copper alloy, while only about 0.3 percent of the uranium was concurrently dissolved.

*Example 2*

In order to demonstrate the feasibility of uranium purification in a liquid-liquid extraction process, an alloy of uranium and chromium consisting of 5 weight percent of chromium and the balance uranium, having a melting point of 859° C., was prepared. A portion of this alloy weighing 14.7 grams was placed in a zirconia crucible along with 14.7 grams of a magnesium-copper alloy, consisting of 65 weight percent of copper and the balance magnesium, and placed in a muffle furnace and heated under an inert atmosphere to a temperature of 900°–940° C. This temperature was maintained for a period of three hours. The furnace charge was then cooled rapidly. The solidified metal was removed from the crucible and samples of the upper and lower layers were taken and chemically analyzed. The analysis of the two layers is listed in the following table.

| | Composition—weight percent | | | |
|---|---|---|---|---|
| | U | Cr | Mg | Cu |
| Top layer | 0.17 | .015 | 34.2 | 64.6 |
| Bottom layer | 91.0 | 4.47 | 0.79 | 3.7 |

The analysis indicates that the uranium-chromium layer remained immiscible with the magnesium-copper alloy during the heating period with very little transfer of constituents between the layers. Therefore, impurities from the bottom layer can become distributed between the two layers during the present process resulting in a purification of the uranium layer.

*Example 3*

As a further example of the process of the invention, a uranium-chromium alloy, consisting of 6 weight percent of chromium, 30 parts per million each of cerium and strontium, and the balance lightly irradiated uranium, is prepared in the form of 2 buttons, each about 2 centimeters in diameter and 2 millimeters thick. Together the two buttons weigh 26.5 grams. The two buttons and 51 grams of a magnesium-copper alloy, consisting of 70 weight percent of magnesium and the balance copper, are placed in a zirconia crucible in a muffle furnace and heated to a temperature of 950° C. under an inert atmosphere. The temperature of 950° C. is maintained for about four hours. No agitation of the liquid layers is attempted. The furnace charge is cooled quickly to the solidification temperature. Samples of the upper and lower layers are then analyzed chemically and radiochemically. The chemical analysis shows that the upper layer consists of about 0.12 percent of uranium and about 0.75 percent of chromium and the balance magnesium and copper. The bottom layer consists substantially of 94 percent of uranium and 6 percent of chromium. The radiochemical analysis shows that about 80 percent of the cerium and 15 percent of the strontium originally in the uranium-chromium alloy is transferred to the magnesium-copper alloy.

Having now described the process of the present invention, other embodiments thereof will at once be apparent to those skilled in the art, and the scope of the invention is to be considered limited only by the scope of the claims hereinafter appended.

We claim:

1. The method of purifying an impure uranium metal, while maintaining said impure uranium metal in substantially immiscible form with respect to molten mangesium-copper alloy which comprises: intimately contacting said uranium metal with said molten magnesium-copper alloy for at least one hour, the amount by weight of molten magnesium-copper alloy being at least equal to the amount by weight of uranium in the uranium metal, said molten magnesium-copper alloy comprising at least 30 weight percent of magnesium and at least 20 weight percent of copper and not more than 10 percent by weight of other metals, and separating said molten magnesium-copper alloy from said immiscible uranium metal.

2. The method of purifying an impure uranium metal which comprises: providing said uranium metal in solid particulate form; maintaining said uranium metal in solid form while intimately contacting it with a molten magnesium-copper alloy at a temperature of at least 550° C. and for at least one hour, the amount by weight of molten magnesium-copper alloy being at least equal to the amount by weight of uranium in the uranium metal, said molten magnesium-copper alloy comprising at least 30 weight percent of magnesium and at least 20 weight percent of copper and not more than 10 percent by weight of other metals, said uranium metal being substantially immiscible with said magnesium-copper alloy, and separating said molten magnesium-copper alloy from said immiscible, solid form uranium metal.

3. The method of purifying an impure uranium metal, while maintaining said impure uranium metal in substantially immiscible form with respect to molten magnesium-copper alloy which comprises: intimately contacting said uranium metal, while the uranium metal is in molten form, with said molten magnesium-copper alloy at a temperature of at least 550° C. and for at least one hour, the amount by weight of molten magnesium-copper alloy being at least equal to the amount by weight of uranium in the uranium metal, said molten magnesium-copper alloy comprising at least 30 weight percent of magnesium and at least 20 weight percent of copper and not more than 10 percent by weight of other metals, and separating said molten magnesium-copper alloy from said immiscible uranium metal.

4. The method of purifying an impure uranium metal, while maintaining said impure uranium metal in substantially immiscible form with respect to molten magnesium-copper alloy which comprises: intimately contacting said uranium metal with said molten magnesium-copper alloy at a temperature of at least 550° C. and for at least one hour, the amount by weight of molten magnesium-copper alloy being at least equal to the amount by weight of uranium in the uranium metal, said molten magnesium-copper alloy comprising at least 50 weight percent of magnesium and at least 20 weight percent of copper and not more than 10 percent by weight of other metals, and separating said molten magnesium-copper alloy from said immiscible uranium metal.

5. The method of purifying an impure uranium metal, while maintaining said impure uranium metal in subtantially immiscible form with respect to molten magnesium-copper alloy which comprises: intimately contacting said uranium metal with said molten magnesium-copper alloy at a temperature of at least 550° C. and for at least one hour, the amount by weight of molten magnesium-copper alloy being at least equal to the amount by weight of uranium in the uranium metal, said molten magnesium-copper alloy comprising 1.5 to 4 parts of magnesium per part of copper by weight, and not more than 10 percent by weight of other metals, and separating said molten magnesium-copper alloy from said immiscible uranium metal.

6. The method of extracting thorium from uranium-thorium alloy which comprises: intimately contacting said uranium-thorium alloy, while it is in, and remains in, solid form, with a molten magnesium-copper alloy at a temperature of at least 550° C. for at least one hour, the amount by weight of molten magnesium-copper alloy being at least equal to the amount by weight of uranium in the uranium-thorium alloy, said molten magnesium-copper alloy comprising at least 30 weight percent of magnesium and at least 20 weight percent of copper and not more than 10 percent by weight of other metals, and separating said molten magnesium-copper alloy from solid immiscible uranium.

7. The method of purifying an impure uranium-chromium alloy comprising from about 3 to 10 percent by weight of chromium and the balance substantially uranium, which comprises intimately contacting said uranium-chromium alloy, while it is in molten form, with a molten magnesium-copper alloy at least one hour, the amount by weight of molten magnesium-copper alloy being at least equal to the amount by weight of uranium in the uranium-chromium alloy, said molten magnesium-copper alloy comprising at least 30 weight percent of magnesium and at least 20 weight percent of copper and not more than 10 percent by weight of other metals, and separating said molten magnesium-copper alloy from said uranium-chromium alloy.

8. The method of purifying an impure uranium metal, while maintaining said impure uranium metal in substantially immiscible form with respect to molten magnesium-copper alloy which comprises intimately contacting said uranium metal with at least 4 parts by weight of said molten magnesium-copper alloy per part of miscible impurity in the impure uranium metal at a temperature of at least 550° C. and for at least one hour, said molten magnesium-copper alloy comprising at least 30 weight percent of magnesium and at least 20 weight percent of copper and not more than 10 percent by weight of other metals, the weight of said magnesium-copper alloy being at least equal to the weight of uranium, and separating said molten magnesium-copper alloy from said immiscible uranium metal.

9. The method of purifying an impure uranium metal, while maintaining said impure uranium metal in subtantially immiscible form with respect to molten magnesium-copper alloy which comprises: intimately contacting said uranium metal with at least 6 parts by weight of said molten magnesium-copper alloy per part of miscible impurity in the impure uranium metal at a temperature of at least 550° C. and for at least one hour, said molten magnesium-copper alloy comprising at least 30 weight percent of magnesium and at least 20 weight percent of copper and not more than 10 percent by weight of other metals, the weight of said magnesium-copper alloy being at least equal to the weight of uranium, and separating said molten magnesium-copper alloy from said immiscible uranium metal.

References Cited in the file of this patent
UNITED STATES PATENTS

| | | |
|---|---|---|
| 2,778,730 | Spedding et al. | Jan. 22, 1957 |
| 2,934,425 | Knighton et al. | Apr. 26, 1960 |
| 3,034,889 | Spedding et al. | May 15, 1962 |
| 3,053,650 | Teitel | Sept. 11, 1962 |